W. A. GEHRINGER.
RESILIENT WHEEL.
APPLICATION FILED MAR. 10, 1913.

1,083,396.

Patented Jan. 6, 1914.

Witnesses
Robert M. ...
A. I. Hind.

Inventor
W. A. GEHRINGER
By Watson E. Coleman
Attorney

UNITED STATES PATENT OFFICE.

WILLIAM A. GEHRINGER, OF ALLENTOWN, PENNSYLVANIA.

RESILIENT WHEEL.

1,083,396.

Specification of Letters Patent.

Patented Jan. 6, 1914.

Application filed March 10, 1913. Serial No. 753,450.

*To all whom it may concern:*

Be it known that I, WILLIAM A. GEHRINGER, a citizen of the United States, residing at Allentown, in the county of Lehigh and State of Pennsylvania, have invented certain new and useful Improvements in Resilient Wheels, of which the following is a specification, reference being had to the accompanying drawings.

This invention relates to improvements in resilient vehicle wheels, and an object thereof is the provision of a wheel of this character in which a plurality of pneumatic balls are arranged to absorb the shocks imposed upon the wheel.

A further object of this invention is the provision of a wheel having a plurality of pneumatic balls supported therein, the balls being arranged between the hub and the rim of the wheel so that liability of puncture is lessened.

A still further object of this invention is the provision of a resilient wheel comprising a hub and an inner and outer rim, the rims being spaced, and a plurality of pneumatic balls arranged between the inner rim and the hub, the outer rim being connected to the balls, whereby limited movement of the outer rim relative to the inner rim of the wheel is allowed.

With these and other objects in view my invention consists in certain novel constructions, combinations and arrangements of parts to be hereinafter more fully described, claimed and illustrated in the accompanying drawings, in which—

Figure 1:
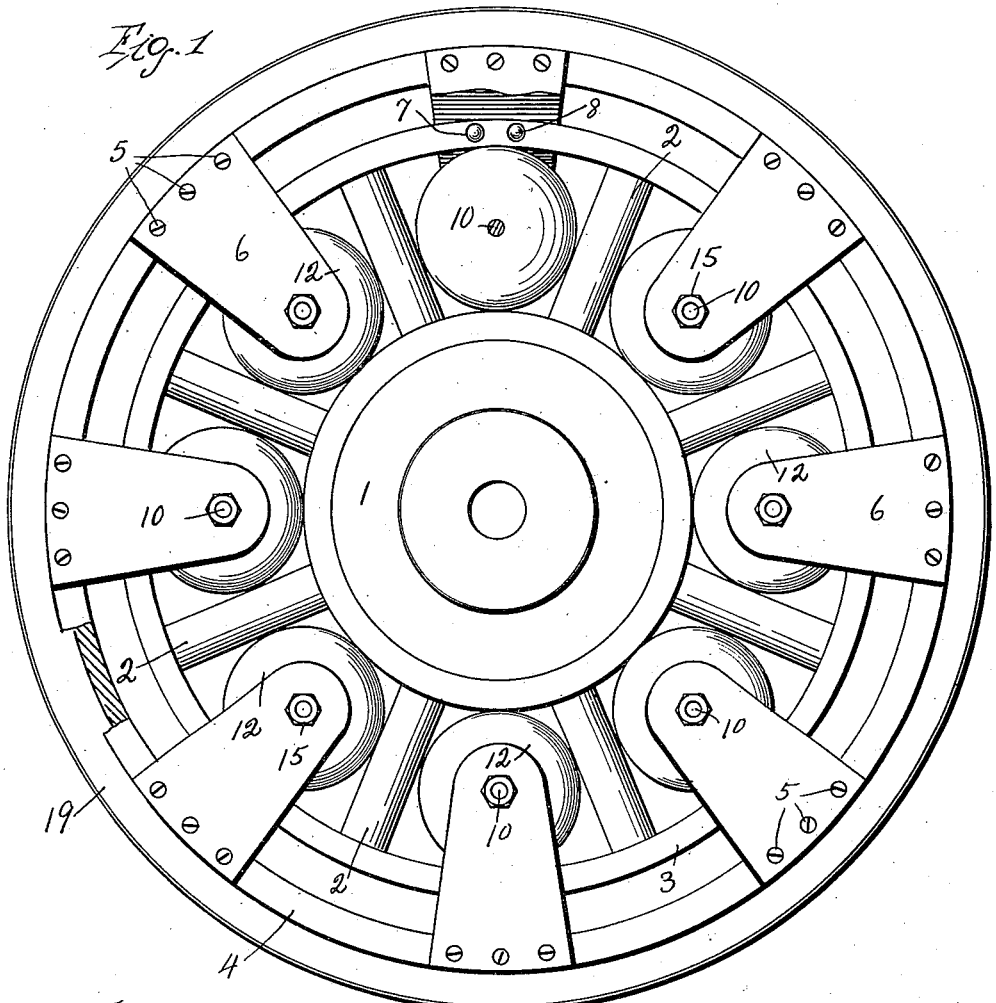
Figure 2:
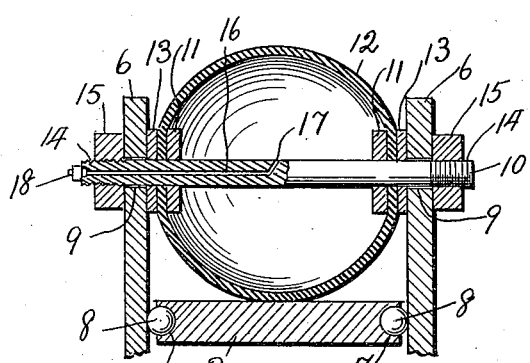

Figure 1 is a side elevation of my device; and Fig. 2 is a transverse section thereof.

Referring more particularly to the drawings, the numeral 1 designates the hub of my improved wheel, and 2 the spokes, to the outer ends of which is connected the rim 3. The outer rim 4 which is of relatively greater diameter than the inner rim 3, is spaced from the inner rim, and connected to the opposite edges of the outer rim by bolts 5 or other suitable fastening means are pairs of guide plates 6, which extend inwardly from the outer rim between the spokes. Formed in the opposite edges of the inner rim 3 between the spokes 2, are recesses 7 in which balls 8 are seated, the plates 6 being adapted to rest against the balls 8, thereby reducing the friction between the plates 6 and the inner rim. The inner ends of each pair of plates 6 are formed with openings 9, in which the opposite end of a shaft 10 is rotatably mounted, the shafts being formed with spaced washers 11 intermediate of their ends. A hollow rubber ball 12 is mounted upon each of the shafts 10, the washers 11 bearing against the inner periphery of the balls, and suitable washers 13 are disposed upon the shafts 10 to engage the outer periphery of the balls, whereby tight joints are formed between the balls 12 and the shafts 10. Each of the shafts is threaded upon its opposite ends as at 14, and nuts 15 are adapted to engage upon the threaded ends of the shafts to bear against the outer faces of the plates 6 to maintain the shafts in position. Each of the shafts 10 is provided with an air duct 16 which extends from one end of the shaft to a point intermediate of its ends, the inner end of the duct being angular, as at 17, to communicate with the interior of the ball. Each shaft is provided on one end with a reduced threaded nipple 18, which registers with the duct 16, whereby suitable means may be connected to the nipple to inflate the hollow ball 12. Preferably the outer rim 4 is formed of channeled metal, so that a solid rubber tire may be secured thereto.

The operation of my improved wheel is, as follows: In the practical use thereof the wheel is applied to the vehicle in the ordinary manner, and it will be seen from the drawing, that each of the balls 12 bears at diametrically opposite points upon the outer face of the hub and the inner face of the inner rim, and upon the adjacent spokes, so that movement of the outer rim in any direction is checked owing to the resiliency of the balls. The entire weight of the vehicle rests upon the pneumatic balls 12, and the shock ordinarily imposed upon the vehicle when the wheel strikes an obstruction is absorbed by all of the balls owing to the engagement with the spokes of the wheel, and the hub and inner rim. Should any of the balls become worn out through continued use, they may be readily removed from the wheel by removing one plate 6 of each pair, and a new ball and shaft 10 may be readily secured to the wheel.

Having thus fully described my invention what I desire to claim and secure by Letters Patent is:

A vehicle wheel comprising a hub, a plurality of spokes radiating from the hub, an inner rim secured upon the outer extremities of the spokes, a plurality of inflatable spherical members positioned between adjacent spokes and interposed between the periphery of the hub and inner rim and engaging said spokes and hub and inner rim, an outer rim, a plurality of inwardly directed plates secured upon the opposite sides of the outer rim and arranged in pairs and bridging the inner rim, a shaft rotatably carried by the inner extremities of each pair of plates and extending through one of the inflatable members, each shaft serving as means for conducting compressed air to the interior of the inflatable member through which it extends, and anti-friction means carried by the sides of the inner rim and adapted to coact with the plates.

In testimony whereof I hereunto affix my signature in the presence of two witnesses.

WILLIAM A. GEHRINGER.

Witnesses:
MABEL BERKEMEYER,
EDW. F. BERKEMEYER.

Copies of this patent may be obtained for five cents each, by addressing the "Commissioner of Patents, Washington, D. C."